(12) United States Patent  
Zhou

(10) Patent No.: US 8,255,711 B2  
(45) Date of Patent: Aug. 28, 2012

(54) POWER SUPPLY CIRCUIT

(75) Inventor: Hai-Qing Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 360 days.

(21) Appl. No.: 12/753,052

(22) Filed: Apr. 1, 2010

(65) Prior Publication Data

US 2011/0121657 A1 May 26, 2011

(30) Foreign Application Priority Data

Nov. 26, 2009 (CN) .......................... 2009 1 0310498

(51) Int. Cl.  
*G06F 1/00* (2006.01)
(52) U.S. Cl. ...................................................... 713/300
(58) Field of Classification Search .................. 713/300, 713/310, 320, 321, 323, 324  
See application file for complete search history.

(56) References Cited

U.S. PATENT DOCUMENTS

| 7,774,633 | B1 * | 8/2010 | Harrenstien et al. .......... 713/323 |
| 2009/0300375 | A1 * | 12/2009 | Zou et al. ...................... 713/300 |
| 2010/0001589 | A1 * | 1/2010 | Shi ................................ 307/115 |
| 2010/0211811 | A1 * | 8/2010 | Zhou et al. .................... 713/330 |

* cited by examiner

*Primary Examiner* — Mohammed Rehman  
*Assistant Examiner* — Vincent Chang  
(74) *Attorney, Agent, or Firm* — Altis Law Group, Inc.

(57) ABSTRACT

A power supply circuit for a graphic card on a motherboard includes first to fourth electrical switches. The first electrical switch is connected to the motherboard to receive a power good signal from the motherboard. The second electrical switch is connected between the first electrical switch and each of the third and fourth electrical switches. The third and fourth electrical switches provide power to the graphic card. The first electrical switch is turned on or off according to the voltage of the power good signal. The second electrical switch is turned on or off by the first electrical switch, so as to selectively control one of the third and fourth electrical switches turn on to output power to the graphic card.

4 Claims, 2 Drawing Sheets

POWER SUPPLY CIRCUIT

BACKGROUND

1. Technical Field

The present disclosure relates to power supply circuits, and more particularly to a power supply circuit for graphic cards.

2. Description of Related Art

Commonly, although graphic cards within a computer system are idle when the computer system is on standby, a power supply continues to provide power to the graphic cards to allow the graphic cards to quickly respond once the computer wakes.

The voltage of the power supply is usually 3.3 volts (V). The circuit outputting a 3.3V voltage is complicated and costly.

DETAILED DESCRIPTION

Figure 1:
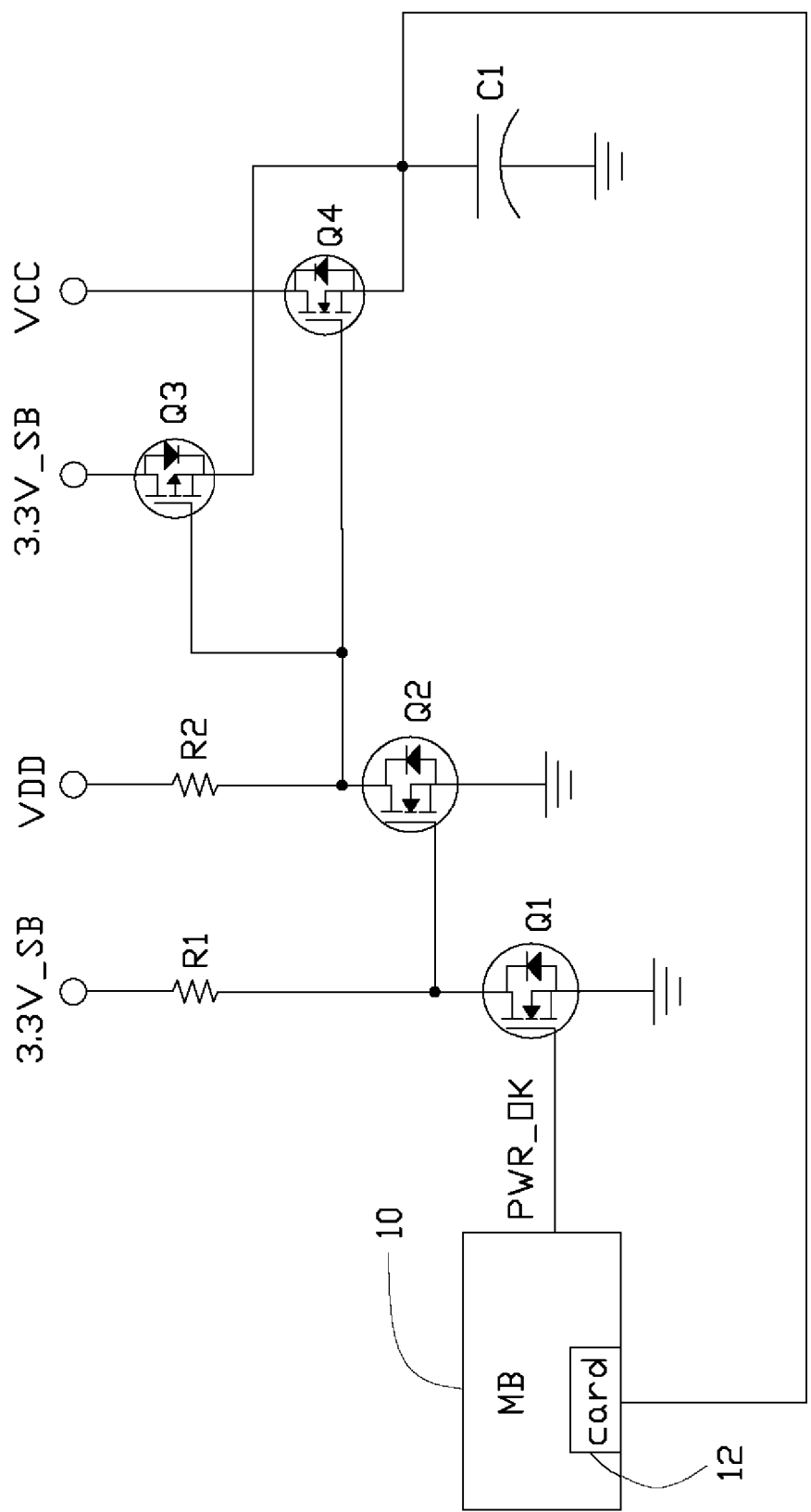
FIG. 1 is a circuit diagram of an exemplary embodiment of a power supply circuit connected to a 3.3 volt (V) standby power supply.

Referring to FIG. 1, an exemplary embodiment of a power supply circuit providing power to a graphic card 12 of a motherboard 10 of a computer includes three n-channel enhanced metal-oxide-semiconductor field-effect transistors (MOSFETs) Q1, Q2, and Q4, a p-channel enhanced MOSFET Q3, two resistors R1 and R2, and a capacitor C1.

A gate of the MOSFET Q1 receives a power good signal PWR_OK from the motherboard 10, a source of the MOSFET Q1 is grounded, a drain of the MOSFET Q1 is connected to a 3.3V standby power supply 3.3V_SB via the resistor R1. A gate of the MOSFET Q2 is connected to the drain of the MOSFET Q1, a source of the MOSFET Q2 is grounded, and a drain of the MOSFET Q2 is connected to a 12V first power supply VDD via the resistor R2. A gate of the MOSFET Q3 and a gate of MOSFET Q4 are both connected to the drain of the MOSFET Q2. A drain of the MOSFET Q3 is connected to the standby power supply 3.3V_SB. A drain of the MOSFET Q4 is connected to a second power supply VCC. A source of the MOSFET Q3 and a source of the MOSFET Q4 are connected to the graphic card 12 and connected to a first terminal of the capacitor C1. A second terminal of the capacitor C1 is grounded.

Commonly, the motherboard 10 includes several power supplies, whose standard voltage values are respectively 12V, 5V, 3.3V, and so on. Only when all the voltages of the power supplies respectively achieve the standard voltages does the power good signal PWR_OK indicate high voltage level, and the computer is operating normally, with voltage values of the first and second power supply VDD and VCC respectively 12V and 3.3V. When the power good signal PWR_OK is at low voltage level, the voltages output by the power supplies of the motherboard 10 are not stable, while the standby power supply 3.3V_SB outputs a stable 3.3V voltage all the time.

The MOSFETs Q3 and Q4 may be integrated in a chip, such as an FDS4501H chip. In other embodiments, the MOSFETs Q1-Q4 may be replaced of other types of electrical switches.

Figure 2:
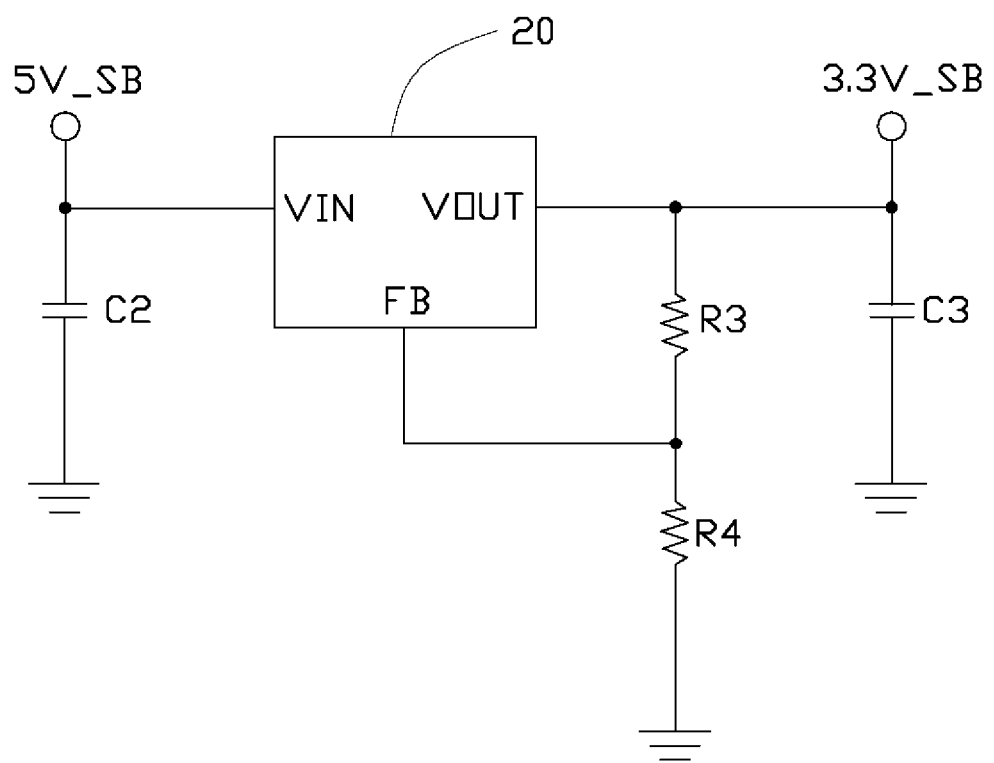
FIG. 2 is a circuit diagram showing generation of the 3.3V standby power supply of FIG. 1, in accordance with an embodiment.

Referring to FIG. 2, the standby power supply 3.3V_SB is converted by a standby power supply 5V_SB of the motherboard 10 through a voltage converting circuit 20. The voltage converting circuit 20 includes two resistors R3 and R4, two capacitors C2 and C3, and a voltage regulator 20. The voltage regulator 20 includes an input terminal VIN, an output terminal VOUT, and a feedback terminal FB. The input terminal VIN is connected to the standby power supply 5V_SB and grounded via the capacitor C2. The output terminal VOUT is grounded via the capacitor C3 and grounded via the resistors R3 and R4 in series. The feedback terminal FB is connected to a node between the resistors R3 and R4. The output terminal VOUT outputs the standby power supply 3.3V_SB.

In use, when the motherboard 10 is operating normally, namely the power good signal PWR_OK received by the gate of the MOSFET Q1 is at high voltage level and all the power supplies of the motherboard 10 respectively achieve the standard voltages, the MOSFET Q1 is turned on, the drain of the MOSFET Q1 outputs a low voltage, thereby the gate of the MOSFET Q2 is at low voltage level, the MOSFET Q2 is turned off, the drain of the MOSFET Q2 outputs a high voltage, the MOSFET Q3 is turned off, the MOSFET Q4 is turned on, and the source of the MOSFET Q4 provides power to the graphic card 12.

When the motherboard 10 of the computer is suspended, the power good signal PWR_OK is at low voltage level. The MOSFET Q1 is turned off, the drain of the MOSFET Q1 outputs a high voltage, such that the gate of the MOSFET Q2 is at high voltage level, the MOSFET Q2 is turned on, the drain of the MOSFET Q2 outputs a low voltage, the MOSFET Q3 is turned on, the MOSFET Q4 is turned off, and the source of the MOSFET Q3 provides power to the graphic card 12.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power supply circuit for a graphic card on a motherboard, the power supply circuit comprising:
   a first electrical switch comprising first to third terminals, wherein the first terminal is operable to receive a power good signal from the motherboard, the second terminal is connected to a standby power supply via a first resistor, and the third terminal is grounded;
   a second electrical switch comprising first to third terminals, wherein the first terminal is connected to the second terminal of the first electrical switch, the second terminal is connected to a first power supply via a second resistor, and the third terminal is grounded;
   a third electrical switch comprising first to third terminals, wherein the first terminal is connected to the second terminal of the second electrical switch, and the second terminal is connected to the standby power supply; and
   a fourth electrical switch comprising first to third terminals, wherein the first terminal is connected to the second terminal of the second electrical switch, the second terminal is connected to a second power supply, and the third terminal is connected to the third terminal of the third electrical switch;
   wherein the second and third terminals of each of the first, second, and fourth electrical switches are connected when the first terminal of the corresponding electrical switch is at high voltage level; the second and third terminals of the third electrical switch are connected when the first terminal of the third electrical switch is at low voltage level; the first and second power supplies output high voltages when the power good signal is at high voltage level, the standby power supply outputs a high voltage all the time.

2. The power supply circuit of claim 1, wherein the third terminals of the third and fourth electrical switches are grounded via at least one capacitor.

3. The power supply circuit of claim 2, wherein the first, second, and fourth electrical switches are n-channel enhanced metal-oxide-semiconductor field-effect transistors (MOSFETs), the third electrical switch is a p-channel enhanced MOSFET, and the first to third terminals of each of the first to fourth electrical switches correspond to a gate, a drain, and a source.

4. The power supply circuit of claim 1, wherein the voltage values of the first power supply, the second power supply, and the standby power supply are respectively 12 volts (V), 3.3V, and 3.3V.

* * * * *